D. Morris.
Pruning-Knife.
No. 122,633.             Patented Jan. 9, 1872.
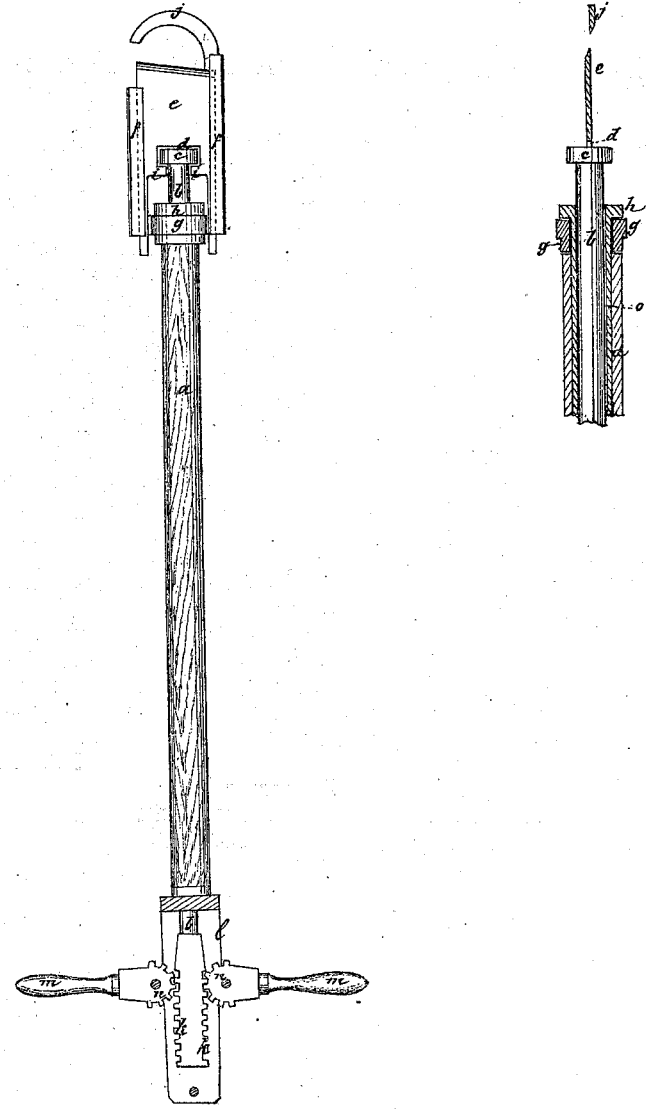
Witnesses:
Inventor:
D. Morris.
Per
Attorneys.

UNITED STATES PATENT OFFICE.

DAVID MORRIS, OF BARTLETT, OHIO.

IMPROVEMENT IN PRUNING-KNIVES.

Specification forming part of Letters Patent No. 122,633, dated January 9, 1872; antedated January 1, 1872.

*To all whom it may concern:*

Be it known that I, DAVID MORRIS, of Bartlett, in the county of Washington and State of Ohio, have invented a new and Improved Pruning-Knife; and I do hereby declare the following to be a full, clear, and exact description of the same, reference being had to the accompanying drawing making a part of this specification, in which—

Figure 1 is a side elevation, and Fig. 2 is a partial transverse section.

This invention is an improvement in pruning-knives of the class in which a cutter or blade is operated by a single hand-lever having a toothed head which engages with serrations formed on the lower end of a sliding rod. The invention consists in the arrangement of the hook and knife for rotating on the head of the tubular stem or handle of the instrument.

Referring to the drawing, $a$ is the tubular wooden handle. $o$ is an iron pipe inclosed within the wooden handle; $b$, the rod inclosed within the pipe $o$, to the upper end of which rod is attached a disk, $c$, that enters a slot, $d$, in the blade $e$, which slides in grooved guides $f$ attached to opposite sides of a ring, $g$, that sits loosely on the pipe $o$ between a thimble, $h$, attached to the end of said pipe and the end of the handle $a$, which construction enables the blade, hook, and guides to be rotated so that a limb in any position may be reached by them. The hook $j$ projects from one of the guides $f$. Arms $i$ extend from the blade $e$ under the disk $c$ so as to prevent the latter from withdrawing from the blade. Racks $k$ are formed at each side of the lower end of the rod $b$. A frame, $l$, is secured to the extremity of the pipe $o$, from which frame a pair of ears extend outward at each side, in each of which pair of ears is pivoted a lever, $m$, having a segmental serrated head, $n$. The heads $n$ engage with the racks $k$, and by working the levers $m$ the rod $b$ is made to reciprocate so as to operate the blade $e$.

Having thus described my invention, what I claim as new, and desire to secure by Letters Patent, is—

The hook $j$, frame $f\ g$, and blade $e$, connected with the head of the tubular handle $a$ and rod $b$, substantially as shown and described, whereby they are adapted to rotate thereon, as specified.

DAVID MORRIS.

Witnesses:
SAMUEL LEE,
VIOLA LEE.

(63)